March 2, 1937. H. M. ULLSTRAND ET AL 2,072,144
ABSORPTION REFRIGERATING SYSTEM
Original Filed April 5, 1933
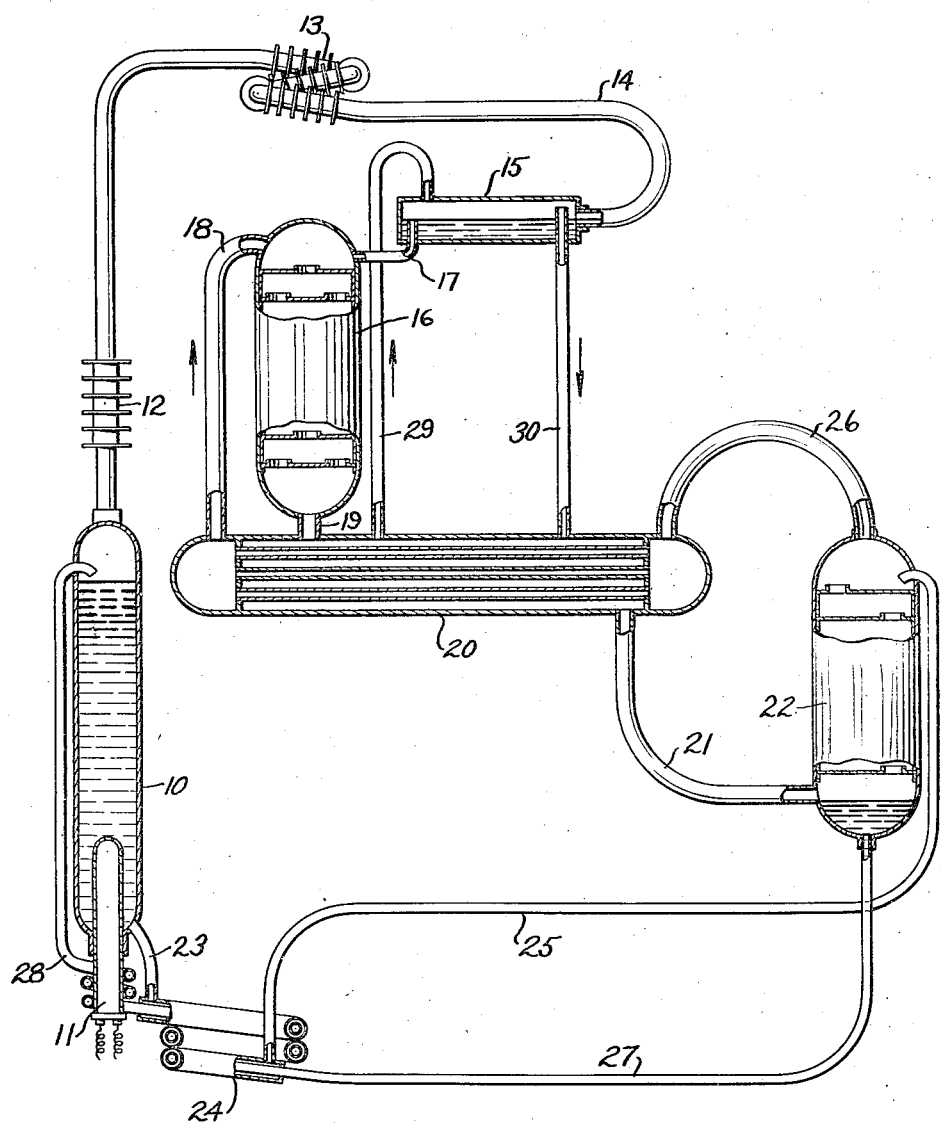
INVENTOR.
H. M. Ullstrand
H. K. Bergholm
BY
H. Gates Dowell
ATTORNEY.

Patented Mar. 2, 1937

2,072,144

UNITED STATES PATENT OFFICE 2,072,144

ABSORPTION REFRIGERATING SYSTEM

Hugo M. Ullstrand, Evansville, Ind., and Harry K. Bergholm, Larchmont, N. Y., assignors, by mesne assignments, to Servel, Inc., Dover, Del., a corporation of Delaware Application April 5, 1933, Serial No. 664,462
Renewed August 4, 1934

18 Claims. (Cl. 62—119.5)

This invention relates to absorption refrigeration systems and more particularly a system of the type in which refrigerant is evaporated by diffusion into an auxiliary gas.

An object of this invention is to improve a refrigeration system of the above type by making possible lower evaporator temperatures and the invention constitutes an improvement over the arrangement disclosed in an application Serial No. 514,753 filed by S. M. Bäckstrom on February 10, 1931.

As disclosed in the above mentioned application, an improvement in pressure equalized absorption refrigeration systems is obtained by circulating enriched auxiliary medium in contact with liquid refrigerant before the latter enters a space of evaporation. There is provided a precooler comprising a vessel for liquid refrigerant through which enriched gas is circulated.

In accordance with the present invention a similar precooler is provided and better gas circulation obtained by connecting the precooler in an auxiliary or branch circuit communicating with the rich gas portion of the main gas circuit. The invention will be more fully understood by reference to the following description taken in connection with the accompanying drawing, in which, The figure shows diagrammatically, with parts in vertical section, a refrigeration system embodying the invention.

A generator 10 contains a solution of refrigerant such as ammonia in an absorption liquid such as water and is heated by an electric heating element 11. Ammonia vapor expelled from solution in the generator passes through a rectifier 12 into a condenser 13 in which the ammonia vapor is condensed to liquid. The liquid ammonia passes from condenser 13 through conduit 14 into a closed container 15 from which it overflows into the evaporator 16 through conduit 17. The closed container 15 is herein sometimes referred to as a precooler. In the evaporator or evaporation member 16, liquid ammonia evaporates by diffusion into an auxiliary medium or agent such as hydrogen which enters the evaporator through conduit 18.

The resulting gas mixture flows from the evaporator 16 through conduit 19, gas heat exchanger 20, and conduit 21 into the absorber 22. Weak absorption solution flows from the generator 10 through conduit 23, liquid heat exchanger 24, and conduit 25 into the upper part of the absorber 22 where it flows downwardly over the absorber baffle plates absorbing ammonia into solution out of the gas mixture. Weak gas returns through conduit 26, gas heat exchanger 20, and conduit 18 to the evaporator 16, thus completing the gas cycle. Circulation of the gas between the evaporator and absorber occurs automatically due to the difference in specific weights of the rich and weak gas. Enriched absorption liquid collects in the lower part of the absorber 22 from where it is returned to the generator 10 through conduit 27, liquid heat exchanger 24, and a thermosyphon 28, in a manner well known in the art.

That portion of the gas heat exchanger 20 conveying rich gas from the evaporator to the absorber is connected by conduits 29 and 30 to the precooler 15 above the liquid level therein as determined by the overflow conduit 17. There is thus formed an auxiliary or branch gas circuit including the precooler 15 which, during operation of the system, is filled with rich gas from the evaporator 16. Due to the high vapor pressure of the warm liquid ammonia which enters the precooler 15 from the condenser 13, evaporation takes place by diffusion into the rich gas in the upper part of the vessel 15. The liquid ammonia is thus cooled before entrance into the evaporator 16. The gas mixture in the precooler increases in specific weight due to the increased amount of ammonia vapor and descends in conduit 30, thus creating a local circulation of rich gas between the gas heat exchanger 20 and the precooler 15 in addition to the main circulation of gas between the evaporator and absorber, which results in a lower evaporator temperature and less circulation of gas through the evaporator. It will be noted that the gas flows counter-current to the liquid in the precooler.

It will be seen that the container 15 is in effect a second evaporator in which, due to evaporation into the rich pressure equalizing or inert gas, the liquid supplied from the condenser 13 is cooled before entering the evaporator 16. The evaporators 15 and 16 are thermally separate and therefore may operate at different temperatures.

The branch circuit including parts 15, 29 and 30 is so arranged and connected that flow therein is independent of flow through parts 18 and 16. The flow of inert gas through the member 15 is in accordance with the requirements of this member independently of the requirements of member 16.

It will be obvious to those skilled in the art that various other changes may be made in the construction and arrangement without departing from the spirit of the invention and therefore the invention is not limited to what is shown in the drawing and described in the specification but only as indicated in the appended claims.

We claim:

1. In an absorption refrigerating system including an evaporator and an absorber, the method which includes circulating an auxiliary gas between the evaporator and the absorber, evaporating liquid refrigerant by diffusion in the evaporator, and circulating only a portion of the rich gas flowing from the evaporator to the absorber in contact with liquid refrigerant before entrance of the latter into said evaporator.

2. In an absorption refrigerating system including an evaporator and an absorber between which an auxiliary gas circulates, the method which includes conducting only a portion of the gas flowing from the evaporator toward the absorber in contact with and counterflow to liquid refrigerant before entrance of the latter into said evaporator.

3. Absorption refrigeration apparatus including an evaporator, an absorber interconnected therewith for the circulation of gas therebetween, and means for conducting only a portion of the gas flowing from said evaporator to said absorber in contact with liquid refrigerant before entrance of the latter into said evaporator.

4. Absorption refrigeration apparatus including an evaporator, an absorber, a condenser, a precooler, a conduit for liquid from said condenser to said evaporator including said precooler, a main circuit for gas between said absorber and said evaporator, and an auxiliary circuit for gas including said precooler and a portion of said main circuit between said evaporator and absorber.

5. Absorption refrigeration apparatus including an evaporator, an absorber, means including a gas heat exchanger forming a main circuit for gas between said evaporator and absorber, a condenser, a precooler, a conduit for flow of refrigerant from said condenser to said evaporator including said precooler, and an auxiliary gas circuit including said precooler and a portion of said gas heat exchanger in the main circuit between said evaporator and absorber.

6. Absorption refrigeration apparatus including an evaporator, an absorber, means including a gas heat exchanger forming a main circuit for gas between said evaporator and absorber, an auxiliary gas circuit extending from a portion of said heat exchanger in the main circuit between said evaporator and said absorber, and means for conducting liquid refrigerant to said evaporator in contact with gas in said auxiliary circuit.

7. Absorption refrigeration apparatus including an evaporator, an absorber, members forming a main circuit for gas between said evaporator and absorber and an auxiliary path of flow for gas branching from a portion of said main circuit between said evaporator and absorber, and means for conducting liquid refrigerant to said evaporator through a portion of said auxiliary path.

8. In a refrigerating system containing a refrigerant and an auxiliary gaseous fluid into which the refrigerant evaporates, a generator, a condenser, an absorber, means to circulate absorption liquid between the generator and the absorber, means to conduct vaporous refrigerant from the generator to the condenser to be liquefied, a first member in which evaporation of refrigerant takes place, a second member in which evaporation of refrigerant takes place, means to conduct liquid refrigerant from said condenser to said second member, means to conduct liquid refrigerant from said second member to said first member, means to conduct the auxiliary fluid from the absorber to the first member, and means to conduct auxiliary fluid from the first member and separate the same into portions and conduct one portion to said second member and another portion to the absorber and conduct auxiliary fluid from the second member to the absorber.

9. In an absorption refrigeration system including a plurality of evaporation members, the improvement which consists in flowing liquid refrigerant through said members in series and flowing inert gas in part through said members in series and in part through only one of said members, the liquid refrigerant being caused to flow first through a member through which only a portion of the inert gas flows, and said portion of the inert gas having first been caused to flow in contact with liquid refrigerant in another member.

10. In an absorption refrigeration system including a plurality of evaporation members, the improvement which consists in flowing liquid refrigerant through said members in series and flowing inert gas in part through said members in series and in part through only one of said members, the liquid refrigerant being caused to flow first through a member through which only a portion of the inert gas flows, and said portion of the inert gas having first been caused to flow in contact with liquid refrigerant in another member, and flowing the inert gas through one of said members independent of the rate of flow of inert gas through another of said members.

11. In an absorption refrigeration system including a plurality of evaporation members, the improvement which consists in flowing liquid refrigerant through said members in series, flowing inert gas in part through said members in series and in part through only one of said members, the liquid refrigerant being caused to flow first through a member through which only a portion of the inert gas flows, and said portion of the inert gas having first been caused to flow in contact with liquid refrigerant in another member, and causing the flow of gas to take place due to differences in specific gravity of vertically extending bodies of gaseous fluid.

12. In an absorption refrigeration system including a plurality of evaporation members, the improvement which consists in flowing liquid refrigerant through said members in series, flowing inert gas in part through said members in series and in part through only one of said members, the liquid refrigerant being caused to flow first through a member through which only a portion of the inert gas flows, and said portion of the inert gas having first been caused to flow in contact with liquid refrigerant in another member, and causing the flow of gas to take place due to differences in specific gravity of vertically extending bodies of gaseous fluid, the vertically extending bodies for producing flow being different for the different evaporation members whereby the rate of flow of inert gas through one evaporation member is independent of the rate of flow of inert gas through another evaporation member.

13. In an absorption refrigerating system including a plurality of evaporation members, the improvement which consists in flowing liquid refrigerant through said members in series and flowing an auxiliary agent into which the refrigerant evaporates in part through said members in series and in part through only one of said members, the liquid refrigerant being caused to flow first through a member through which only a portion of the auxiliary agent flows, and said portion of the auxiliary agent having first been caused to flow in contact with liquid refrigerant in another member.

14. In a refrigerating system including a plurality of evaporation members, means to conduct liquid refrigerant through said members in series, and means to conduct an auxiliary agent into which the refrigerant evaporates in part through said members in series and in part through only one of said members, the liquid refrigerant being caused to flow first through a member through which only a portion of the inert gas flows, and said portion of the inert gas having first been caused to flow in contact with liquid refrigerant in another member.

15. In a refrigerating system including a plurality of evaporation members, means to conduct liquid refrigerant through said members in series, and means to conduct an auxiliary agent into which the refrigerant evaporates in part through said members in series and in part through less than the total number of said members, the liquid refrigerant being caused to flow first through a member through which only a portion of the auxiliary agent flows, and said portion of the auxiliary agent having first been caused to flow in contact with liquid refrigerant in another member.

16. In a refrigerating system including a plurality of evaporation members, an absorber, means to conduct inert gas from said absorber through said members in series and back to said absorber, means to by-pass inert gas around one of said members, and means to conduct liquid refrigerant first through said one of said members, the gas flowing in said member having first been caused to flow in contact with liquid refrigerant in another member.

17. In a refrigerating system including a plurality of evaporation members, an absorber, means to circulate inert gas through said absorber and one of said members, a branch circuit through another of said members, and means for conducting liquid refrigerant first through the member in said branch circuit and then through said one of said members, said branch circuit being constructed and arranged so that gas flowing therein shall have first been caused to flow in contact with liquid refrigerant in said one of said members.

18. In a refrigerating system including a plurality of evaporation members, an absorber, means to flow liquid refrigerant through said members in series, means to circulate inert gas through said absorber and one of said members due to difference in specific weight of vertical bodies of gaseous fluid, and means forming a branch circuit through another of said members through which inert gas is circulated due to differences in specific weight of vertical bodies of gaseous fluid at a rate independent of the rate of circulation through said one of said members, the liquid refrigerant being caused to flow first through the member in said branch circuit, and said branch circuit being constructed and arranged so that the gas flowing therein shall have first been caused to flow in contact with liquid refrigerant in said one of said members.

HUGO M. ULLSTRAND.
HARRY K. BERGHOLM.